United States Patent
Kuo

(10) Patent No.: US 7,568,206 B2
(45) Date of Patent: Jul. 28, 2009

(54) DISC CHANGER

(75) Inventor: Tsung-Jung Kuo, Hsinchu (TW)

(73) Assignee: Lite-On It Corp., Taipei (TW)

( * ) Notice: Subject to any disclaimer, the term of this patent is extended or adjusted under 35 U.S.C. 154(b) by 902 days.

(21) Appl. No.: 11/196,318

(22) Filed: Aug. 4, 2005

(65) Prior Publication Data

US 2006/0031858 A1    Feb. 9, 2006

(30) Foreign Application Priority Data

Aug. 6, 2004    (TW) .............................. 93123671 A

(51) Int. Cl.
  *G11B 17/22* (2006.01)
  *G11B 17/04* (2006.01)
(52) U.S. Cl. .................... 720/619; 369/30.7; 369/30.74; 369/30.89
(58) Field of Classification Search ................ 720/600, 720/658, 619; 369/30.7, 30.74, 30.85, 30.87, 369/30.89
  See application file for complete search history.

(56) References Cited

U.S. PATENT DOCUMENTS

| | | | | |
|---|---|---|---|---|
| 4,811,319 A | * | 3/1989 | Ikedo et al. .............. | 369/30.84 |
| 5,463,611 A | * | 10/1995 | Kim ......................... | 369/30.85 |
| 5,528,567 A | * | 6/1996 | Kim ......................... | 369/30.94 |
| 5,854,782 A | * | 12/1998 | Tamiya et al. ............... | 720/676 |
| 6,115,210 A | * | 9/2000 | Kakuta et al. ............. | 360/98.01 |
| 6,600,702 B2 | * | 7/2003 | Sato et al. ................. | 369/30.68 |
| 2003/0156507 A1 | * | 8/2003 | Seki et al. ................. | 369/30.85 |
| 2003/0179661 A1 | * | 9/2003 | Sato et al. ................. | 369/30.68 |
| 2004/0027933 A1 | * | 2/2004 | Togashi et al. ........... | 369/30.77 |

* cited by examiner

*Primary Examiner*—William J Klimowicz
(74) *Attorney, Agent, or Firm*—Ming Chow; Sinorica, LLC

(57) ABSTRACT

A disc changer comprises a housing, a disc box, a selecting mechanism, an elevating mechanism, and a driving device. The housing has at least one oblique slot in each side wall. Projections of the oblique slots are interlaced to each other. The disc box fabricated in the housing has a plurality of trays stacking vertically. The selecting mechanism is used for moving vertically to a horizontal position of a predetermined tray of the disc box for pulling out the predetermined tray from the disc box. The elevating mechanism is fabricated in the housing and comprises two slides and a transmission shaft. Each slide is attached to the oblique slot with at least a slide protrusion. Each slide slides back and forth along the respective side wall. The slide protrusion of each slide slides back and forth along the attached oblique slot. By this way, the selecting device can move up and down inside the housing to reach the predetermined tray of the disc box.

8 Claims, 9 Drawing Sheets

DISC CHANGER

BACKGROUND OF THE INVENTION

1. Field of the Invention

The present invention relates to a disc changer, and in particular to one that utilizes an elevating mechanism for controlling elevating and lowering of the selecting mechanism.

2. Prior Art

The optical recording/reproducing apparatus for reading optical discs is broadly used in the information industry and the consuming industry. The typical optical recording/reproducing apparatus comprise DVD players, VCD players, etc.

The conventional optical recording/reproducing apparatus is usually either a slot-loading type equipment or a tray-loading type equipment. No matter what type of the apparatus is, a common feature or, say, a common disadvantage is that the apparatus can only read one disc per one operation. Once that the user wants to change discs, he/she needs to retrieve one disc and reload the other one manually. However, in a disc changer with an interior reading device usually found in a public place, the aforesaid disadvantage is never seen.

Refer to FIG. 1, which is a schematic view of a conventional disc changer 2. The disc changer 2 comprises a shell 4, a disc box 6 having a plurality of trays 602 for stacking discs vertically, a selecting mechanism 8 which can move vertically to pull out a particular disc in the disc box 6, an elevating mechanism 10 for elevating and lowering the selecting mechanism 8, a driving device 11 for driving the elevating mechanism 10, and a reading device 12 for reading data from the selected disc.

The U.S. Pat. No. 5,574,705 and the U.S. Pat. No. 5,991,246 have disclosed part of key technology of the disc changer. However, both the aforesaid patents have a common difficulty in structuring. As shown in FIG. 1, part of the elevating mechanism 10 is connected to the selecting mechanism 8, but other parts of the elevating mechanism 10 are constructed to the shell. Furthermore, the driving device is mounted on the shell and the transmitting mechanism of the driving device is also pretty complicated. They are not only hard to assemble, but also easy to breakdown unexpectedly.

SUMMARY OF THE INVENTION

Accordingly, the major object of the present invention is to provide an elevating mechanism, which can be applied to the disc changer, for controlling the elevating and lowering of the selecting mechanism. The present invention also makes possible the elevating mechanism and other devices to be fabricated by moduling so as to waive the complicated structuring problem described above.

Another object of the present invention is to provide a disc changer whose machinery is simplified, and thereby the production cost and the breakdown probability can be reduced.

The disc charger of the present invention comprises a housing, a disc box, a selecting mechanism, an elevating mechanism, and a driving device. Each side of the housing has at least one oblique slot. Projections of the oblique slots are interlaced to each other. The disc box is fabricated in the housing and has a plurality of trays stacking vertically. The selecting mechanism, also fabricated in the housing, is used for moving vertically to a position of a predetermined tray of the disc box and for further pulling out the predetermined tray from the disc box.

The elevating mechanism is fabricated in the housing and comprises two slides and a transmission shaft. These two slides are separately fabricated in the opposite side walls between the selecting mechanism and the housing. The slide is attached to the respective oblique slot with at least a slide protrusion. The slide protrusion is fabricated on the outer surface of the slide. The slide can slide back and forth along the respective side wall. The slide protrusion of each slide can slide back and forth along the attached oblique slot. A middle point of the transmission shaft is connected to a bottom of the selecting mechanism so as to have two ends of the transmission shaft swing like a lever. Ends of the transmission shaft are connected to the respective slides. The transmission shaft makes the slides moving in the contrary directions.

The driving device, fabricated in the selecting mechanism, is used for moving two slides moving in the contrary directions by driving one of the two slides The contrary movement of the two slides makes the slide protrusions to move in the respective oblique slots with a pattern of "same in the vertical direction but contrary in the horizontal direction". Upon such an arrangement, the driving device can power the elevating mechanism to elevate or lower the selecting mechanism in the housing so as to approach the predetermined tray of the disc box.

The selecting mechanism further comprises a pulling device and a reading device. The pulling device has a pulling hook in one end to engage a tray hook of the predetermined tray. The pulling device can swing to pull the predetermined tray out of the disc box. The reading device further comprises a clamp and an optical pick-up head. When the pulling device pulls out the predetermined disc and moves the center of the disc out from the predetermined tray onto the clamp for holding the center of the disc, the optical pick-up head can be used for reading data from the disc.

Thus, by applying the present invention, the elevating mechanism, the selecting mechanism (including the pulling device and reading device), and the driving device can be fabricated as individual modules. By providing those modules and the oblique slot on the housing, housing the selecting mechanism can now have the ability of elevating and lowering. So, the present invention makes the assembling of the disc changer easier than the conventional device and can further simplify the construction of the machinery. Also, both the production cost and the probability of disc breakdown can be substantially reduced.

BRIEF DESCRIPTION OF THE DRAWINGS

Other objects, advantages, and novel features of the present invention will become more apparent from the following detailed description when taken in conjunction with the accompanying drawings, in which.

DETAILED DESCRIPTION OF THE PRESENT INVENTION

Figure 1:
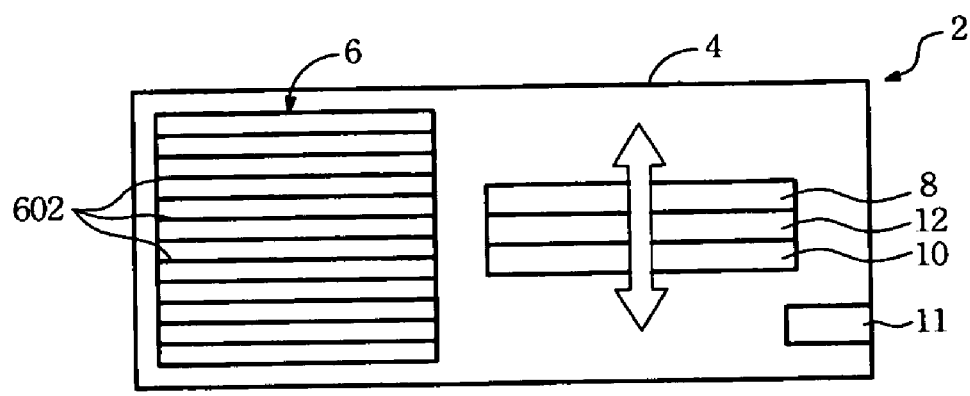
FIG. 1 is a schematic view of a conventional disc changer.
Figure 2:
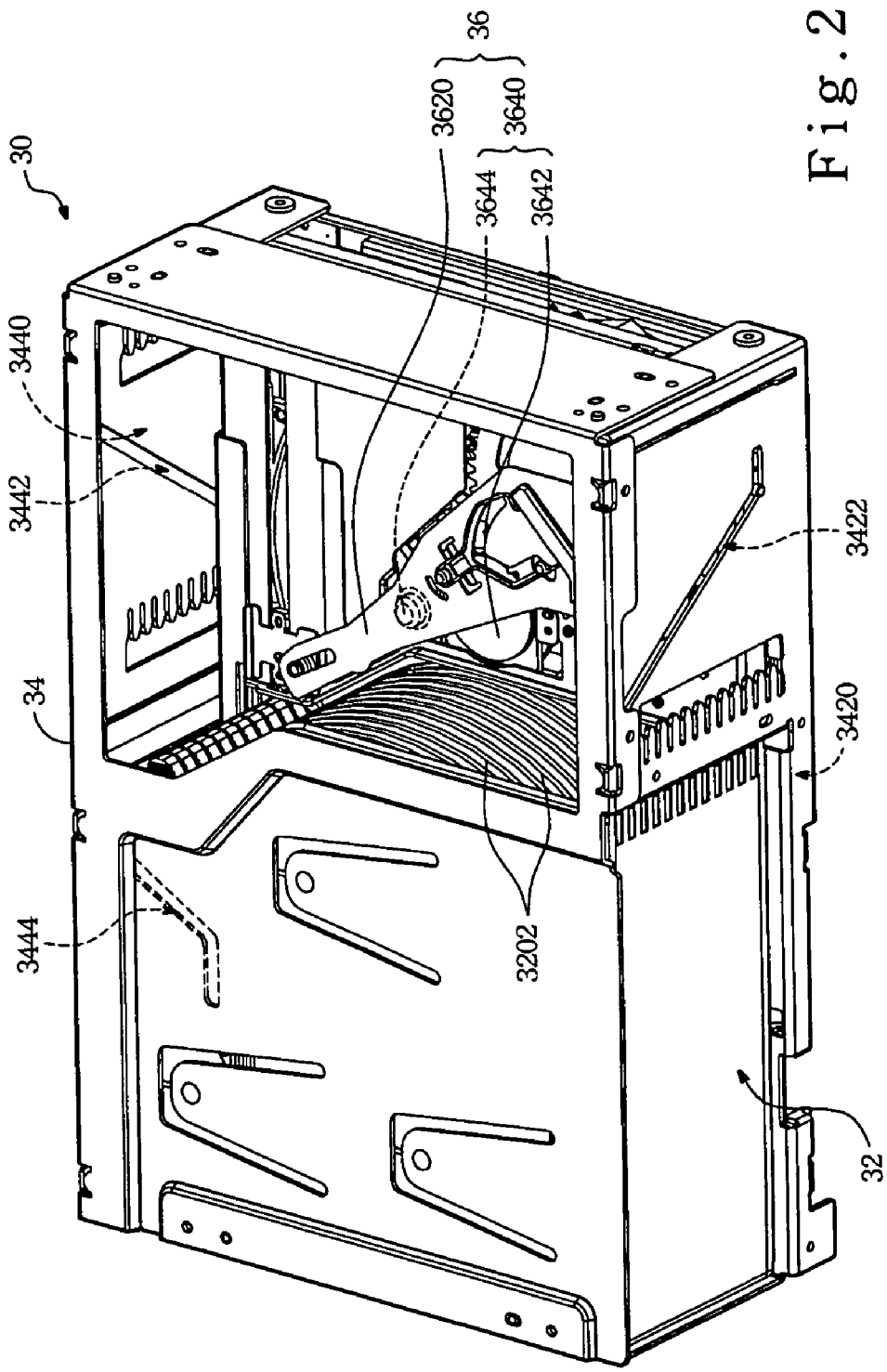
FIG. 2 is a perspective view of a preferred disc changer according to the present invention.

Refer to FIG. 2, which is a perspective view of a disc changer 30 according to the present invention. The disc changer 30 comprises a disc box 32, a housing 34, a selecting mechanism 36, an elevating mechanism (not shown in FIG. 2), and a driving device (not shown in FIG. 2). The selecting mechanism 36 further comprises a pulling device 3620 and a reading device 3640. The disc box 32 further has a plurality of horizontal (or say parallel) trays 3202 stacking vertically.

After the selecting mechanism 36 elevates or lowers to a corresponding horizontal position of a predetermined tray 3202 of the disc box 32, the selecting mechanism 36 can utilize a pulling hook in one end of the pulling device 3620 to hook a tray hook of the predetermined tray 3202. Then, the selecting mechanism 36 can swing to pull the predetermined tray 3202 out of the disc box 32.

Figure 3:
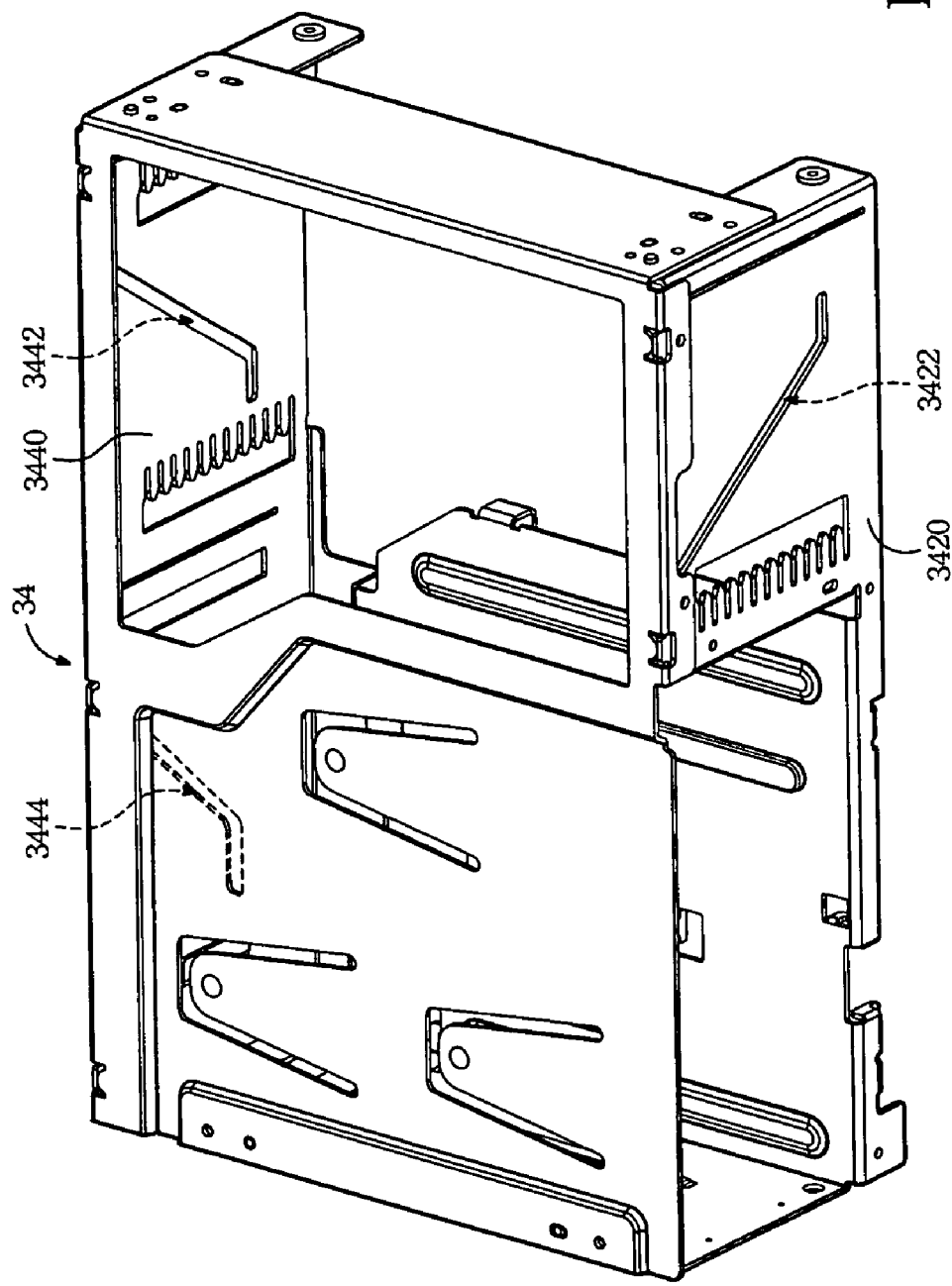
FIG. 3 is a perspective view of the housing of FIG. 2.
Figure 4:
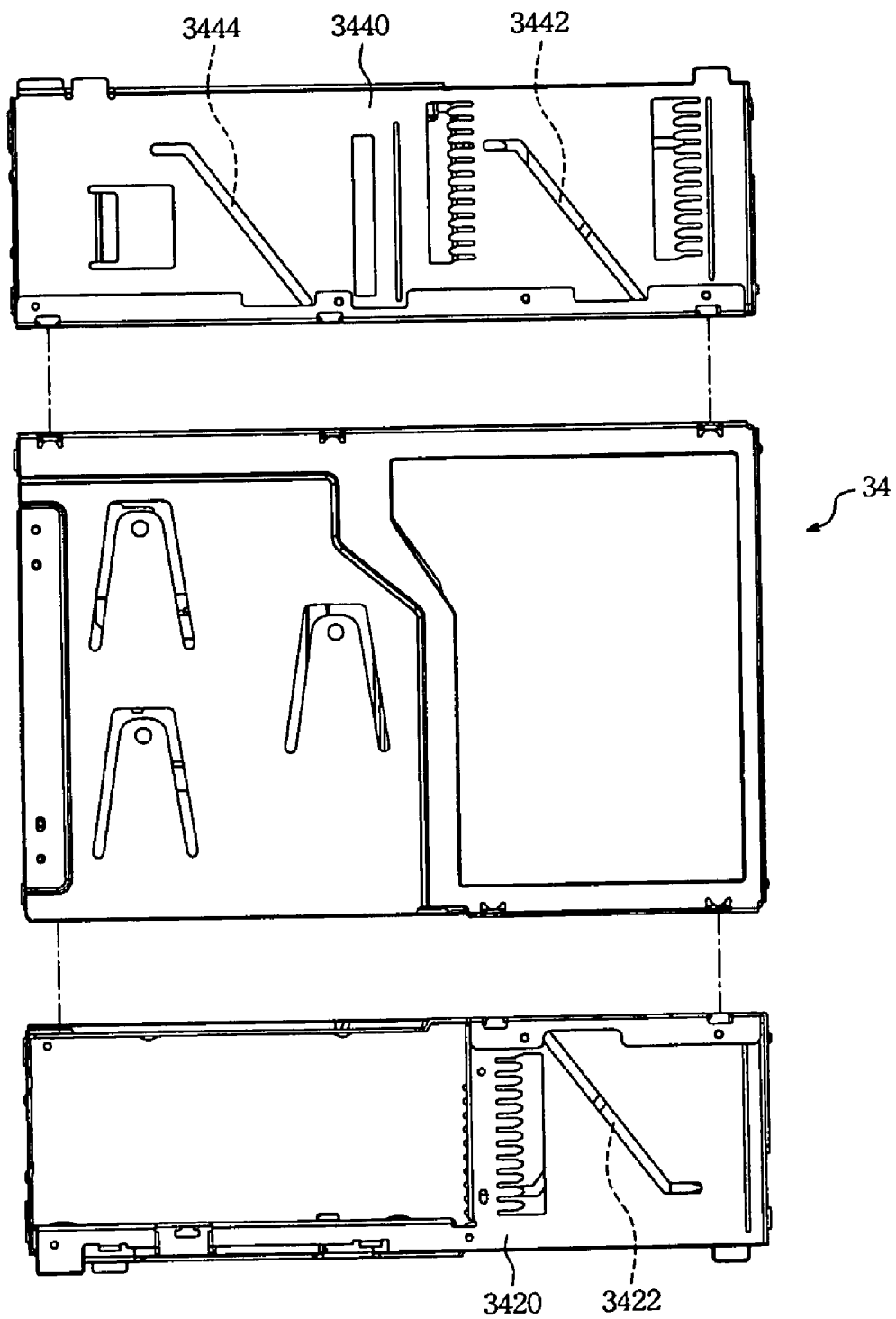
FIG. 4 is a three-side view of FIG. 3.

Refer to FIG. 3 and FIG. 4. FIG. 3 is a perspective view of the housing 34 of FIG. 2. FIG. 4 is a three-side view of the housing 34 of FIG. 3. The housing 34 has at least one oblique slot in each side wall. The projections of the oblique slots are interlaced to each other.

The opposite side walls of the housing 34 are numbered as a first side wall 3420 and a second side wall 3440. The elevating mechanism, the selecting mechanism 36, and the driving device is mounted in the right-hand-side portion of the housing 34, as shown, between the first side wall 3420 and the second side wall 3440. A first oblique slot 3422 is fabricated in the right-hand-side part of the first side wall 3420, and a second oblique slot 3442 is fabricated in the right-hand-side part of the second side wall 3440. The projection of the second oblique slot 3442 is interlaced with the first oblique slot 3422. A third oblique slot 3444 is fabricated in the left-hand-side part of the second side wall 3442, as shown in dash line of FIG. 3, and is parallel to the second oblique slot 3442.

As shown in FIG. 2, the reading device 3640 further comprises a clamp 3642 and an optical pick-up head 3644. When the pulling device 3620 horizontally pulls out a disc and moves the center of the disc 44 out from the predetermined tray 3202 down to a position below the clamp 3642. The clamp 3642 is used for holding the disc 44 through its center and the optical pick-up head 3642 is used for reading data from the disc 44.

Figure 5:
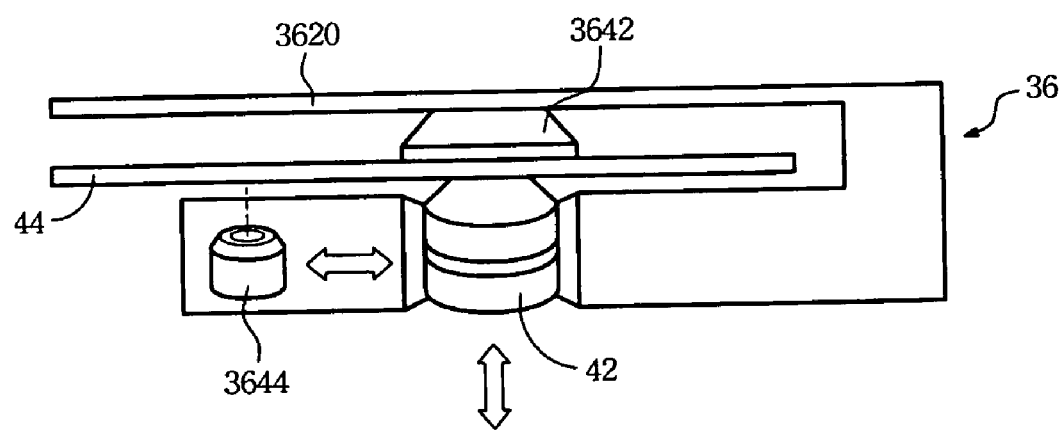
FIG. 5 is a schematic view showing that the selecting mechanism of FIG. 2 holds a disk.

Refer to FIG. 5, which is a schematic view showing the selecting mechanism 36 clipping the disc 44 of FIG. 2. After the selecting mechanism 36 reaches a horizontal position corresponding to the predetermined tray 3202 and pulls the disc 44 out of the predetermined tray 3202, the clamp 3642 can cooperate with the spindle motor 42 to anchor the disc 44. When the disc 44 is positioned, the spindle motor 42 can then rotates the disc 44 and the optical pick-up head 3644 can approach along the radial direction of the disc 44 so as to read the data from different positions of the disc 44.

Figure 6:
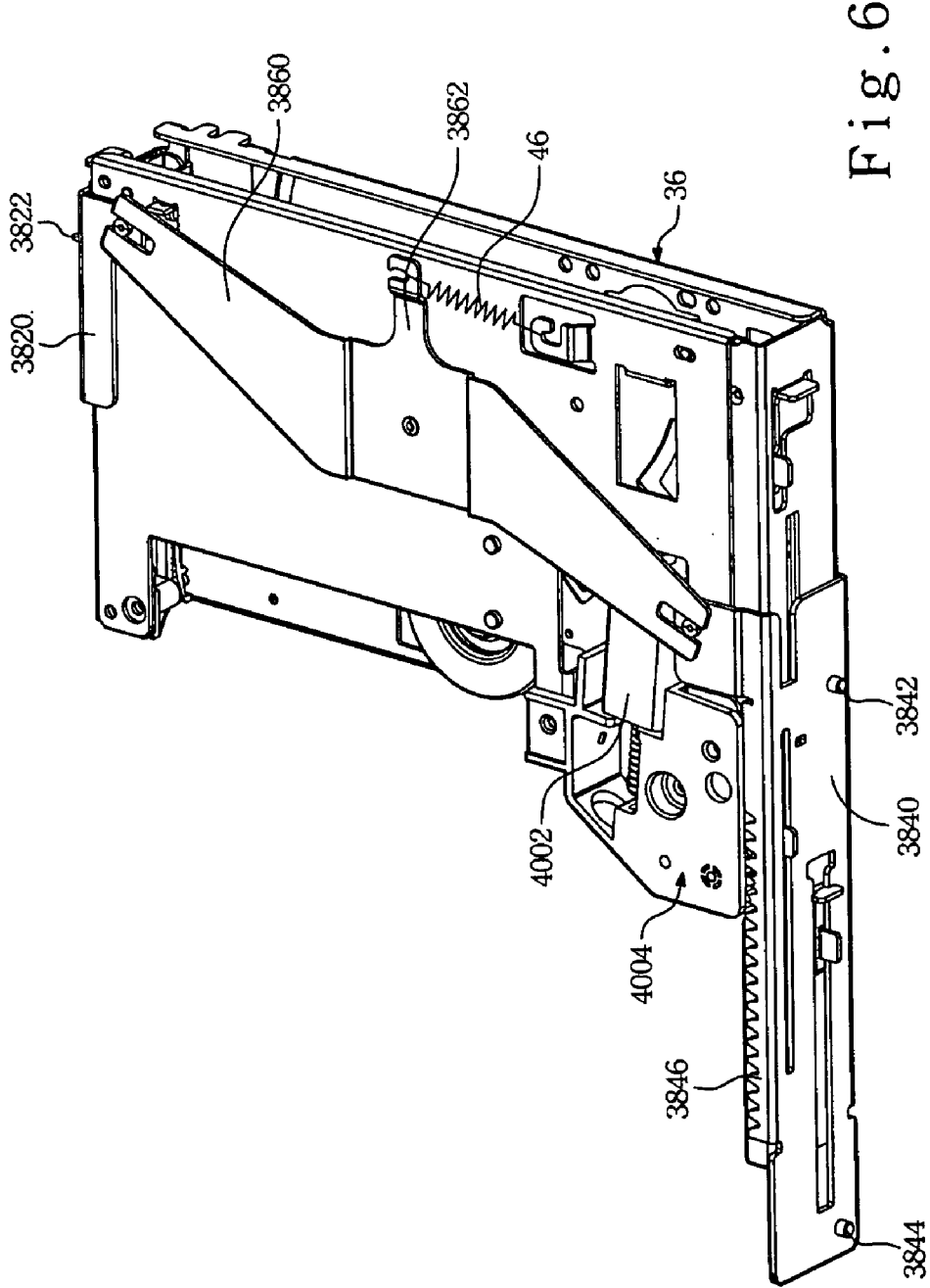
FIG. 6 is a perspective view of the selecting mechanism of FIG. 2 when the first slide is lower than the second slide.
Figure 7:
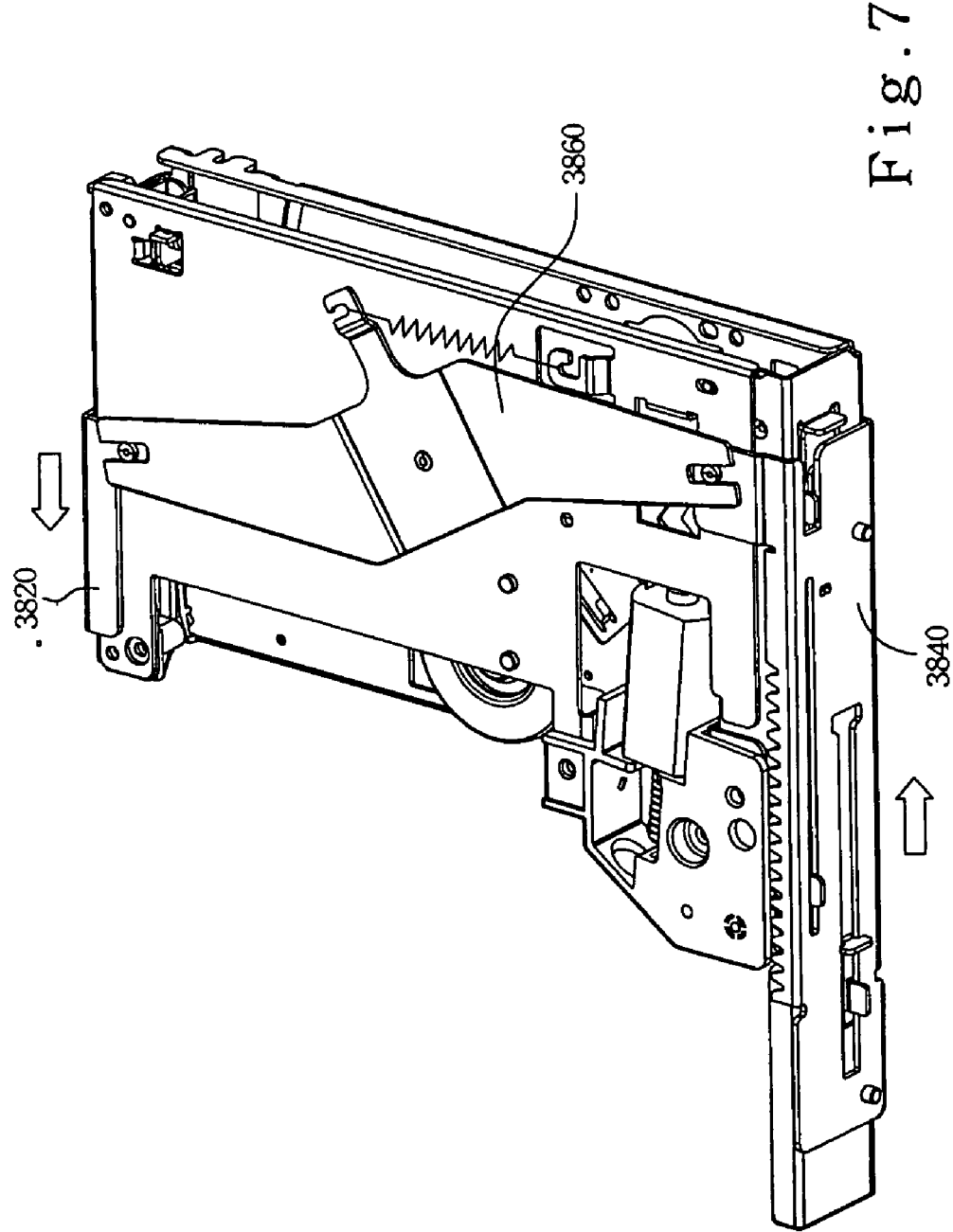
FIG. 7 is another perspective view of the selecting mechanism of FIG. 2 when the first slide is higher than the second slide.
Figure 8:
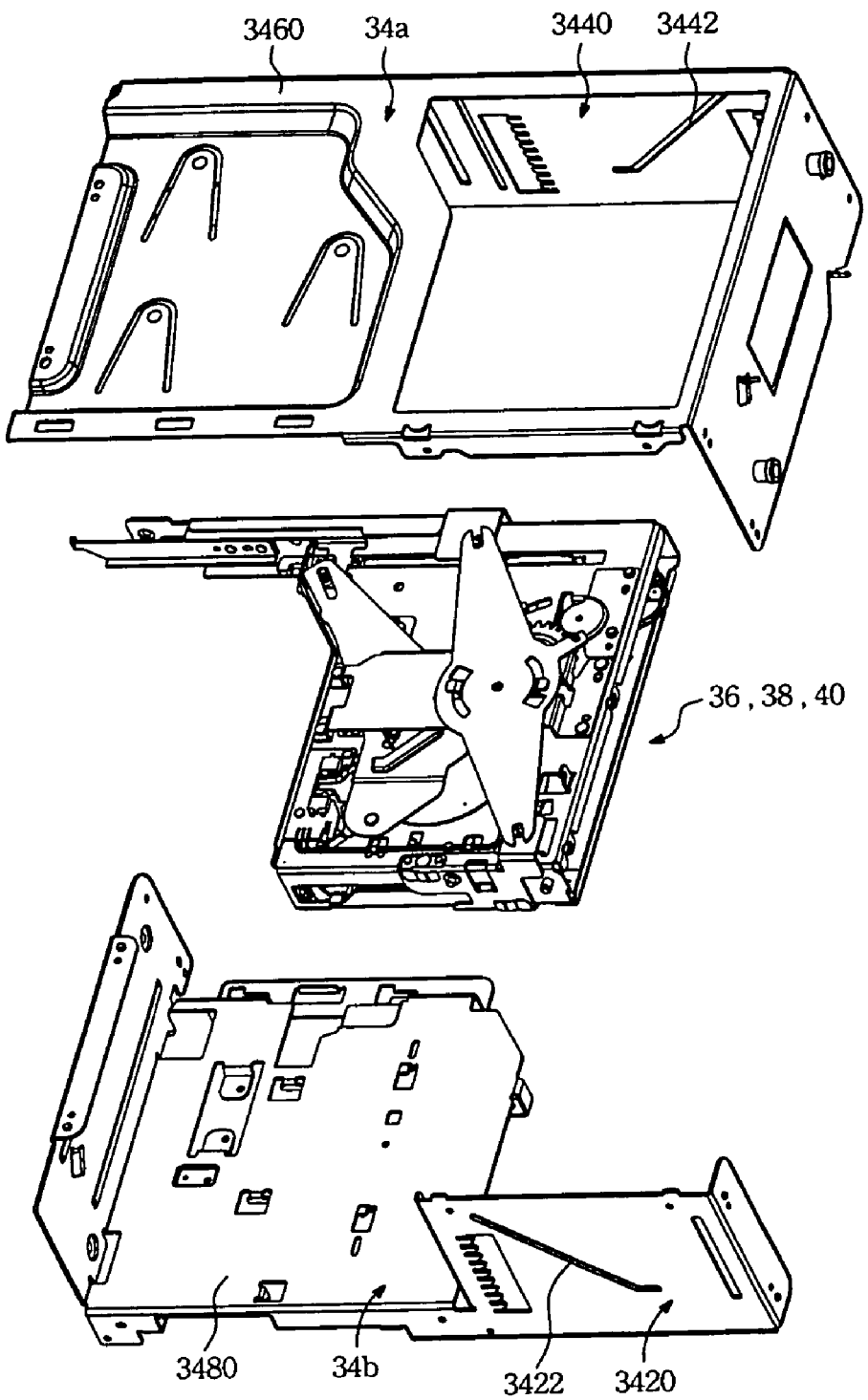
FIG. 8 is an exploded view showing how to fabricating the housing of FIG. 2.

Refer to FIG. 6 and FIG. 7. FIG. 6 is a perspective view of the selecting mechanism of FIG. 2 at a state that a first slide 3820 is lower than a second slide 3840. FIG. 7 is also a perspective view of the selecting mechanism of FIG. 2, but, at another state that the first slide 3820 is higher or, say, upper than the second slide 3840. Also shown in FIG. 6 and FIG. 7 are the elevating mechanism 38 and the driving device 40.

The elevating mechanism 38 further comprises two slides 3820, 3840 and a transmission shaft 3860. These two slides 3820, 3840 are separately mounted to the opposing lateral walls of the selecting mechanism 36. The first slide 3820 is located near the first side wall 3420 of FIG. 2 and the second slide 3840 is located near the second side wall 3440 of FIG. 2. Each of the slides 3820, 3840 can slide back and forth along the respective lateral wall of the selecting mechanism 36 as shown in FIG. 6 and FIG. 7.

Each slide is attached to the oblique slot with at least a slide protrusion. A first slide protrusion 3822 is fabricated on the out surface of the first slide 3820. The first slide protrusion 3822 slides back and forth along the attached first oblique slot 3422. A second slide protrusion 3842 and a third slide protrusion 3844 are fabricated on the out surface of the second slide 3840. The second slide protrusion 3842 slides back and forth along the attached second oblique slot 3442. The third slide protrusion 3844 slides back and forth along the attached third oblique slot 3444.

A middle point of the transmission shaft 3860 is connected to a bottom of the selecting mechanism 36 and thus to enable the transmission shaft 3860 to swing like a lever. The two ends of the transmission shaft 3860 are pivotally and slidably connected to the slides 3820, 3840 respectively so as to make the slides 3820, 3840 to slide in contrary directions.

The driving device 40 mounted inside the selecting mechanism 36 comprises a motor 4002 and a transmission box 4004. The motor 4002 is mounted in the selecting mechanism 36 to provide the driving force. The transmission box 4004 including at least a gear set is also mounted in the selecting mechanism 36. A rack 3846 is formed to the skirt of the second slide 3840. The transmission box 4004 is located near the skirt of the second slide 3840. An output gear of the transmission box 4004 can mesh with the rack 3846 and thereby the driving force from the motor 4002 can be transmitted to push the second slide 3840 moving back and forth linearly along the side of the selecting mechanism 36.

When the second slide 3840 is driven by the driving device 40, the first slide 3820 and the second slide 3840 would slide in contrary directions due to the connection of the transmission shaft 3860. As noted, the second slide protrusion 3842 and the third slide protrusion 3844 on the second slide 3840 slide along the second oblique slot 3442 and the third oblique slot 3444, respectively, and the first slide protrusion 3822 on the first slide 3820 slides along the first oblique slot 3422. Upon such an arrangement, the selecting mechanism 36 can move up and down inside the housing 34 so as to locate the predetermined tray 3202 of the disc box 32.

As shown in FIG. 6 and FIG. 7, the transmission shaft 3860 further comprises an extension 3862 from the middle of the transmission shaft 3860. The free end of the extension 3862 is connected to the selecting mechanism 36 via a spring 46. By providing the restoring force from the spring 46, the elevating mechanism 38 can be resumed to a predetermined balanced state (as shown in FIG. 6) while the driving device 40 is actuated. It means when the elevating mechanism 38 doesn't receive the driving force from the driving device 40, the module integrating the selecting mechanism 36, the elevating mechanism 38, and the driving device 40 can be located at the bottom of the disc changer 30.

As described, the disc changer of the present invention groups the elevating mechanism 38, the selecting mechanism 36 including the reading device 3640 and the pulling device 3620, and the driving device into a module. In addition, by constructing the oblique slots 3422, 3842, 3844 on the housing 34, the module can move up and down inside the housing 34.

Furthermore, the disc changer 30 according to the present invention can be fabricated easily and has simplified machinery. Thereby, the production cost and the probability of breakdown can be reduced.

As described, the disc changer of the present invention groups the elevating mechanism 38, the selecting mechanism 36 including the reading device 3640 and the pulling device 3620, and the driving device into a module. In addition, by constructing the oblique slots 3422, 3442, 3444 on the housing 34, the module can move up and down inside the housing 34.

The upper housing 34a comprises an upper component 3460 and a second side wall 3440 extending downward from the upper component 3460. The lower housing 34b comprises a lower component 3480 and a first side wall 3420 extending upward from the lower component 3480. The lower housing 34b matches the upper housing 34a to form the housing 34 and the space formed in between can be provided to accommodate the module that includes the selecting mechanism 36, the elevating mechanism 38, and the driving device 40.

Figure 9:
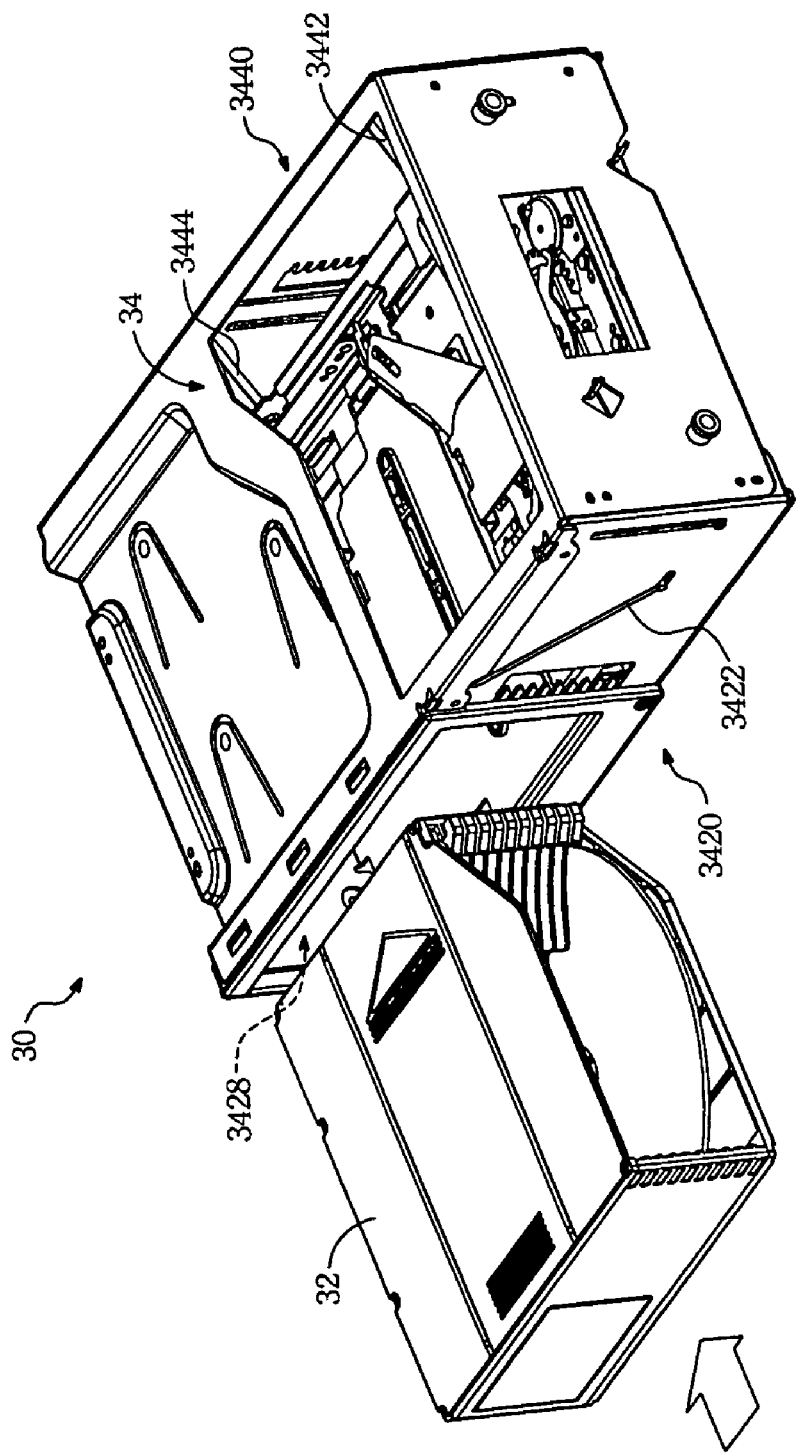
FIG. 9 is an exploded view of the disc box and the housing of FIG. 2.

Refer to FIG. 9, which is a diagram of the disc box 32 and the housing 34. The disc box 32 can be put into the housing 34 from the opening 3428 of the housing 34. If a user wants to increase the number of the trays in the disc box 32, the user just needs to replace a larger housing 34, which has extended oblique slots 3422, 3442, 3444 in the side walls 3420, 3440, and a larger opening 3428.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disc changer, comprising:
   a housing, having two opposing side walls, each of the side walls further including at least one oblique slot, projections of the oblique slots being interlaced;
   a disc box, fabricated in the housing, further having a plurality of trays stacking vertically;
   a selecting mechanism, fabricated in the housing, for moving vertically in the housing so as to reach a horizontal position of a predetermined tray of the disc box to further pull out the predetermined tray from the disc box;
   an elevating mechanism, fabricated in the housing, further comprising:
      two slides, separately fabricated on opposite lateral walls between the selecting mechanism and the housing, each of the slides slidably engaged with the respective oblique slot by at least a slide protrusion fabricated on an outer surface of the respective slide, each of the slides sliding back and forth along the lateral walls when the respective slide protrusion slides back and forth along the engaged oblique slot; and
      a transmission shaft, having a middle point thereof connected to a bottom of the selecting mechanism so as to make two opposing ends of the transmission shaft to swing like a lever, the ends of the transmission shaft connected respectively to the slides so as to have the slides moving in contrary directions; and
   a driving device, fabricated in the selecting mechanism, for driving one of the slides to make both of the slides moving in the contrary directions, further making the slide protrusions moving in the respective oblique slots, and then driving the elevating mechanism to make the selecting mechanism elevating and lowering in the housing so as to reach the predetermined tray of the disc box.

2. The disc changer of claim 1, wherein the selecting mechanism further comprises:
   a pulling device, having a pulling hook in one end to hook a tray hook of the predetermined tray, for swinging to pull the predetermined tray out of the disc box; and
   a reading device, further comprising a clamp and an optical pick-up head, when the pulling device pulls out a predetermined disc and moves a center of the disc to a position below the clamp for the clamp to hold the center of the disc and for the optical pick-up head to read data from the disc.

3. The disc changer of claim 2, wherein the selecting mechanism further comprises a spindle motor, when the clamp clips the disc, the spindle motor for rotating the disc letting the optical pick-up head read the data from the disc.

4. The disc changer of claim 1, wherein the opposite side walls of the housing are named as the first side wall and the second side wall, the elevating mechanism fabricated in a right-hand-side space of the housing between the first side wall and the second side wall, the first oblique slot fabricated in the first side wall neighboring the right-hand-side space, the second oblique slot fabricated in the second side wall neighboring the right-hand-side space, projections of the second oblique slot interlaced with that of the first oblique slot, a third oblique slot fabricated in the second side wall far away the right-hand-side space and being parallel to the second oblique slot.

5. The disc changer of claim 4, wherein the housing comprises:
   an upper housing, comprising an upper component and a second side wall extending downward from the upper component; and
   a lower housing, comprising a lower component and a first side wall extending upward from the lower component;
   wherein the lower housing matches with the upper housing to form the housing and an interior space for accommodating a module including the disc box, the selecting mechanism, the elevating mechanism, and the driving device.

6. The disc changer of claim 4, wherein the slides are named as the first slide and the second slide, a first slide protrusion fabricated on an outer surface of the first slide and connected slidably to the first oblique slot for sliding along the first oblique slot, a second slide protrusion fabricated on the outer surface of the second slide and connected slidably to the second oblique slot for sliding along the second oblique slot, a third slide protrusion fabricated on an outer surface of the third slide and connected slidably to the third oblique slot for sliding along the third oblique slot, wherein, when the driving device drives the second slide, the first slide and the second slide slide in the contrary directions, and also the first slide protrusion slides in the contrary directions to both the second slide protrusion and the third slide protrusion, such that the selecting mechanism moves inside the housing to reach the predetermined tray of the disc box.

7. The disc changer of claim 1, wherein one of the slides comprises a rack, the driving device comprising:
   a motor, mounted in the selecting mechanism, for proving a driving force; and
   a transmission box, mounted also in the selecting mechanism, having a gear set thereof meshing with a rack of the slide, the gear set receiving the driving force from the motor and forwarding to move the slide to slide back and forth.

8. The disc changer of claim 1, wherein the transmission shaft further comprises an extension protruded from transmission shaft, a free end of the extension connected to the selecting mechanism via a spring, by the restoring force, the elevating mechanism being in a predetermined balanced state when the driving device is not actuated.

* * * * *